(12) United States Patent
Hesse

(10) Patent No.: US 8,719,481 B2
(45) Date of Patent: May 6, 2014

(54) METHOD AND ARRANGEMENT FOR STREAMING DATA PROFILING

(75) Inventor: Kay Hesse, Dresden (DE)

(73) Assignee: Intel Mobile Communications Technology Dresden GmbH, Dresden (DE)

( * ) Notice: Subject to any disclaimer, the term of this patent is extended or adjusted under 35 U.S.C. 154(b) by 132 days.

(21) Appl. No.: 13/245,899

(22) Filed: Sep. 27, 2011

(65) Prior Publication Data

US 2012/0079146 A1    Mar. 29, 2012

(30) Foreign Application Priority Data

Sep. 27, 2010    (EP) ...................................... 10180383

(51) Int. Cl.
*G06F 13/14*    (2006.01)
*G06F 13/38*    (2006.01)

(52) U.S. Cl.
CPC .................................. *G06F 13/385* (2013.01)
USPC ......................................................... 710/305

(58) Field of Classification Search
USPC ................ 710/305–315, 8–19, 104–106, 110
See application file for complete search history.

(56) References Cited

U.S. PATENT DOCUMENTS

| | | | |
|---|---|---|---|
| 5,193,179 A | 3/1993 | Laprade et al. | |
| 2006/0155516 A1 | 7/2006 | Johnson et al. | |
| 2006/0259664 A1* | 11/2006 | Sohm | .............................. 710/40 |
| 2010/0064069 A1* | 3/2010 | Shasha | ............................. 710/22 |
| 2011/0202788 A1* | 8/2011 | Hesse et al. | ................... 713/600 |
| 2011/0216861 A1* | 9/2011 | Melzer et al. | ................. 375/354 |

FOREIGN PATENT DOCUMENTS

EP    0465221 A2    1/1992

OTHER PUBLICATIONS

Shannon, Lesley, Simplifying System-on-Chip Design through Architecture and System CAD Tools, Thesis, Department of Electrical and Computer Engineering, University of Toronto, 2006.
European Search Report for EP 11182668.1 dated Jan. 3, 2012.

* cited by examiner

*Primary Examiner* — Raymond Phan
(74) *Attorney, Agent, or Firm* — SpryIP, LLC

(57) ABSTRACT

A circuit arrangement includes a plurality of functional units each of which comprises a plurality of data processing modules and a local controller. The plurality of data processing modules run a common system clock and are connected by a streaming data bus running a handshake-type streaming data transfer protocol. A profiling module of the circuit arrangement assesses control signals tapped at predefined interfaces of the streaming data bus during real time operation, for determining link performance and communication patterns for profiling and debugging purposes, and hence constitutes a simple and low cost approach for assessing intra-component and inter-component link performance and communication patterns on large SoCs. A method for profiling data flow for use in such a circuit arrangement is also provided.

8 Claims, 6 Drawing Sheets

METHOD AND ARRANGEMENT FOR STREAMING DATA PROFILING

CROSS REFERENCE TO RELATED APPLICATIONS

This application claims priority of European application No. 10180383.1 filed on Sep. 27, 2010, the entire contents of which is hereby incorporated by reference herein.

FIELD AND BACKGROUND OF THE INVENTION

The invention relates to a circuit arrangement with a plurality of functional units each of which comprises a plurality of data processing modules and a local controller, said plurality of data processing modules running a common system clock and being connected by a streaming data bus running a handshake-type streaming data transfer protocol. The invention also relates to a method for profiling a data flow of streaming data for use in such a circuit arrangement.

When building large systems-on-a-chip (SoCs) such as for use in mobile communication applications, designers will combine several IP blocks, also known as IP (intellectual property) cores, even possibly from different vendors, via well-defined bus interfaces.

Complex SOCs, with multiple embedded controllers communicating concurrently, both with each other as well as with other hardware units (e.g. data processing modules), pose a challenge when it comes to optimizing system performance, finding bottlenecks and even more so for debugging real-time problems.

Handshake-type bus protocols are known as a simple and straightforward means to stream data between data processing modules within one component of an SoC and also between data processing modules of different components. However, a system based on a handshake-type bus protocol interconnection might still exhibit a complex and unexpected behavior. Even if data is processed nominally, the system performance can still be inferior due to modules stalling each other based on their processing speed and their interdependencies. The system could even run into a deadlock situation, although all modules work in accordance to their specifications. These deadlocks and less fatal bottlenecks are especially hard to debug, since usually they are not caught by simulation, due to resource limitations (time and test cases).

Some examples of complex interdependencies are illustrated in FIGS. 1 and 2.

Several scenarios of how one data processing module of an SoC component can influence another, sometimes via several hops, will be exemplified with reference to FIG. 1. In FIG. 1, the streaming protocol fabric is depicted with bold arrows, control paths with thin arrows. The exemplary component of FIG. 1 comprises six data processing modules 11A-11F and a local controller 12. Data processing module A provides data in aligned manner to both data processing modules B and C. Data processing module C processes data from processing modules A, E, and F in an aligned manner. As will be understood from the figure, a stall, i.e. a delay, in module B can stall module A, because A cannot send data to B. A stall in module A can stall modules E and F, as module C processes data from A, E and F in aligned manner. A stall in module B can stall module C, as module A sends data synchronously to B and C. There is even a possibility of a deadlock situation in case of a ring-dependency among modules A, B, D, and back to A. Hence, if there is not enough FIFO capacity along the route, a stall in one module will bring the whole loop to a halt, and, because of the aforementioned scenarios, all other modules of the component, too.

Whether or not situations as described above will occur depends firstly on the individual module's inherent processing and communication patterns, and secondly on the programming and start sequence by the component controller.

FIG. 2 exemplifies inter-component dependencies illustrating that similar stall scenarios as mentioned above are also possible across component boundaries. FIG. 2 shows a first SoC component 20 controlled by a first local controller 22 and comprising two data processing modules, 21A and 21B, and a second SoC component 30 controlled by a second local controller 32 and comprising two data processing modules, 31C and 31D. In FIG. 2, intra-component streaming data paths are shown in dashed bold arrows, streaming data paths across component boundaries are depicted as solid bold arrows, control paths as thin arrows. As will be understood from FIG. 2, a stall in D, for example, can stall C, as A is sending aligned data to C and D. However, such bottlenecks are even more complicated to detect and avoid, because two independent component controllers are involved.

Various methods are known to tackle the problem of real-time debugging and profiling in general. These include for example debug buses, test code run by the embedded controller(s), means to observe internal states via debug ports, optionally connected to an external logic analyzer.

However, especially when it comes to profiling for system improvement, these known methods pose considerable drawbacks. When using debug ports and/or external logic analyzers, the problem is that on a pin-limited SOC, but also on Field Programmable Gate Array (FPGA) prototypes, there usually are not enough pins to accommodate this task. With internal trace memory, the issue is that on-chip memory is a scarce and expensive resource, especially on an ASIC, and using it just for profiling can usually not be justified. Re-assigning functional memory to profiling is a potential solution, however, there might not be enough internal memory available, or this approach might interfere with normal operation.

Having the embedded controller(s) run a diagnostic code is usually possible with only small extra cost in code and data memory. However, it might be misleading, because the code run changes the actual system timing/behavior, so the profile obtained will be of less value or even wrong.

What is needed in the art, therefore, is a simple and low cost means for assessing intra-component and inter-component link performance and communication patterns on large SoCs.

SUMMARY OF THE INVENTION

According to a first aspect of the invention there is provided a circuit arrangement comprising a plurality of components or functional units each of which comprises a plurality of data processing modules and a local controller, the data processing modules running a common system clock and being connected by a streaming data bus running a handshake-type streaming data transfer protocol which comprises three control signals. These are first and second handshake-type control signals, commonly known as valid and accept signals, and a third control signal which marks the beginning and the end of a frame comprised of a logical group of data elements within the data stream. According to the invention, at least one of the functional units comprises a profiling module which receives at least one set of the first, second, and third control signals tapped at a predefined link of the streaming data bus during real time operation, for determining link performance and communication patterns of the streaming data stream for profiling and debugging purposes. The profiling module is configurable by the local controller of the functional unit or by any other higher level controller of the circuit arrangement coupled with the profiling module by a bus system. The profiling module may comprise a plurality of link selection means with a respective profiler unit connected thereto, for simultaneously determining link performance in a plurality of links of the streaming data bus. Each of the profiler units is adapted to receive the system clock signal and the three control signals of the streaming data protocol as tapped from the selected link to extract link performance parameters therefrom. The profiling module further comprises a software accessible set of control registers for defining a link to be assessed, a link performance acquisition mode, and a time period of the control signals to be assessed, and for storing link performance output parameters from the profiler units.

In one embodiment of the invention, the profiler unit comprises a first counter for determining a number of frames that passed since a last clear operation, a second counter for determining a duration of the sampled frame, a third counter for determining a number of data beats of the sampled frame, and a counter control logic for controlling the first, second, and third counters for a selected frame to be sampled.

According to a presently preferred embodiment of the invention, the profiler unit further comprises a first register connected to an output of the first counter, a first comparator connected between an output of the second counter and a second register, and second comparator connected between an output of the third counter and a third register, the counter control logic being adapted to configure the counters, comparators, and registers for a selected frame to be sampled and in function of a selected acquisition mode.

The presented streaming data profiler unit only requires very little hardware resources, yet can support profiling and debugging to a great extent. Even if it might not pinpoint a problem directly, it will still guide more conventional means of debugging and profiling to the cause of an issue.

According to another aspect, the invention provides a method for profiling a data flow of streaming data for use in a circuit arrangement as described above, the method comprising providing a tapping line from each of a plurality of links of said streaming data bus between any pair of said data processing modules; selecting a link to be assessed; selecting a link performance acquisition mode; tapping said first, second, and third control signals from the selected link to be assessed; and determining a set of link performance parameters from said first, second, and third control signals and said common system clock for a predefined time period of the control signals.

In transfer-based operation modes, the step of determining a set of link performance parameters comprises counting a number of frames that passed since a last clear operation, counting a number of clock ticks for a sampled frame, i.e. determining the duration of a frame, and counting a number of data beats of the sampled frame. So a number of performance parameters can be determined: e.g. the number of frames between two clear operations which are triggered by some event outside the profiler module; the duration of the first, last or Nth frame during this clear period; the duration of the shortest or longest frame, together with its index in the group of frames; the number of actual data transfers in any of these frames; the frame with the minimal or maximal number of data transfers, together with its index.

These parameters can help in finding bottleneck situations where stalls lead to bad duration-to-transfer ratios. They can also be used to spot frames with missing and/or frames with excess data which would indicate a transfer error.

In control-based operation modes, the step of determining a set of link performance parameters comprises to determine a more fine-granular picture of the transfers, by focussing on the handshake signals of the streaming data protocol. For a selected frame the following parameters can be determined: minimum and maximum duration of the valid signal sampled asserted; minimum and maximum duration of the valid signal sampled de-asserted; minimum and maximum duration of the accept signal sampled asserted; minimum and maximum duration of the accept signal sampled de-asserted; minimum or a maximum frame gap and the frame index of the frame before the gap.

These parameters can help to understand why the frame duration/data transfer ratio is not as expected.

Especially for modules that have multiple streaming data ports, instrumentation of all of them with a streaming data profiler according to the invention can show the cause of bus thrashing.

BRIEF DESCRIPTION OF THE DRAWINGS

Additional features and advantages of the present invention will be apparent from the following detailed description of a specific embodiment which is given by way of example only and in which reference will be made to the accompanying drawings, wherein.

DETAILED DESCRIPTION OF PREFERRED EMBODIMENTS

Figure 1:
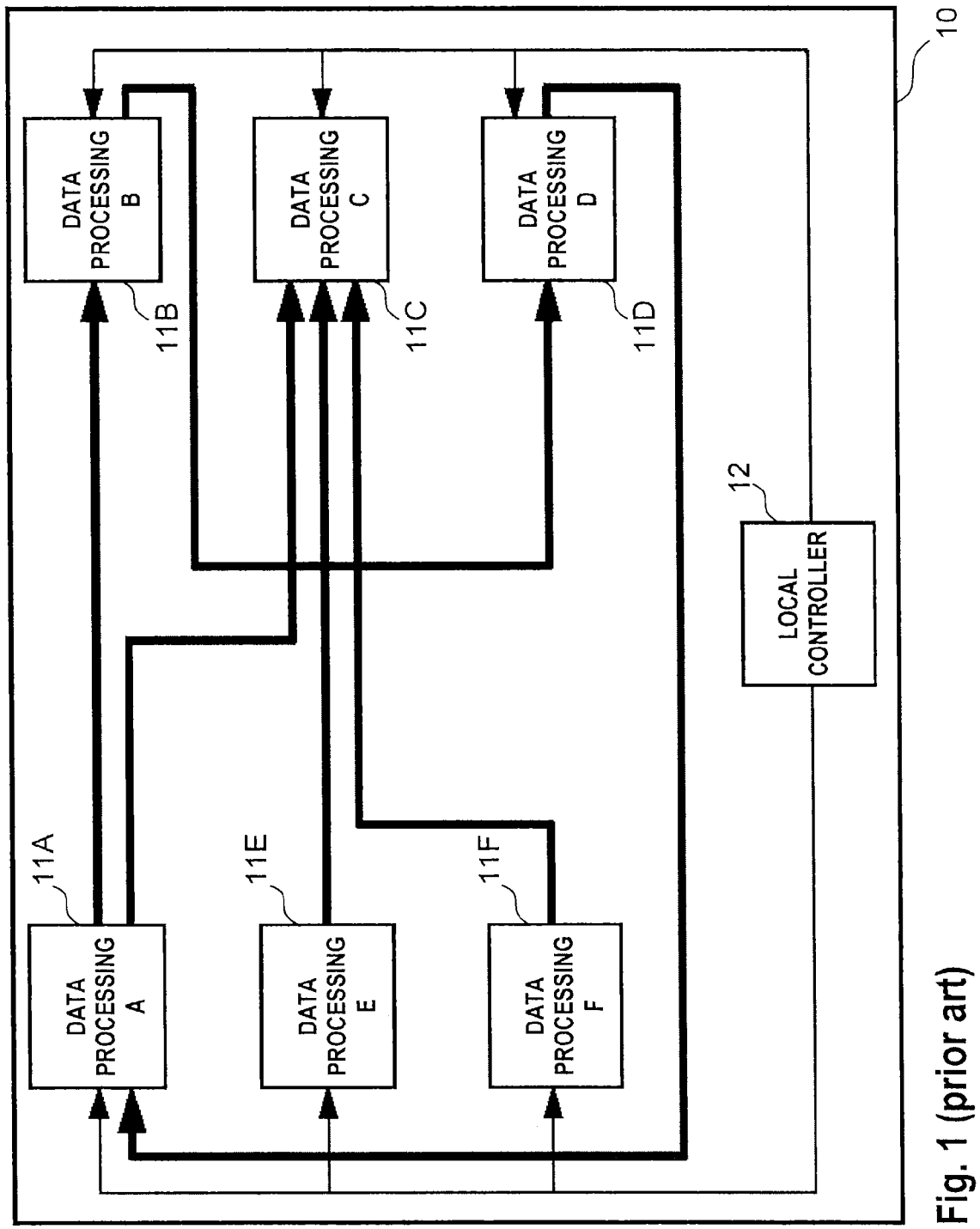
FIG. 1 shows intra-component dependencies of data flow.
Figure 2:
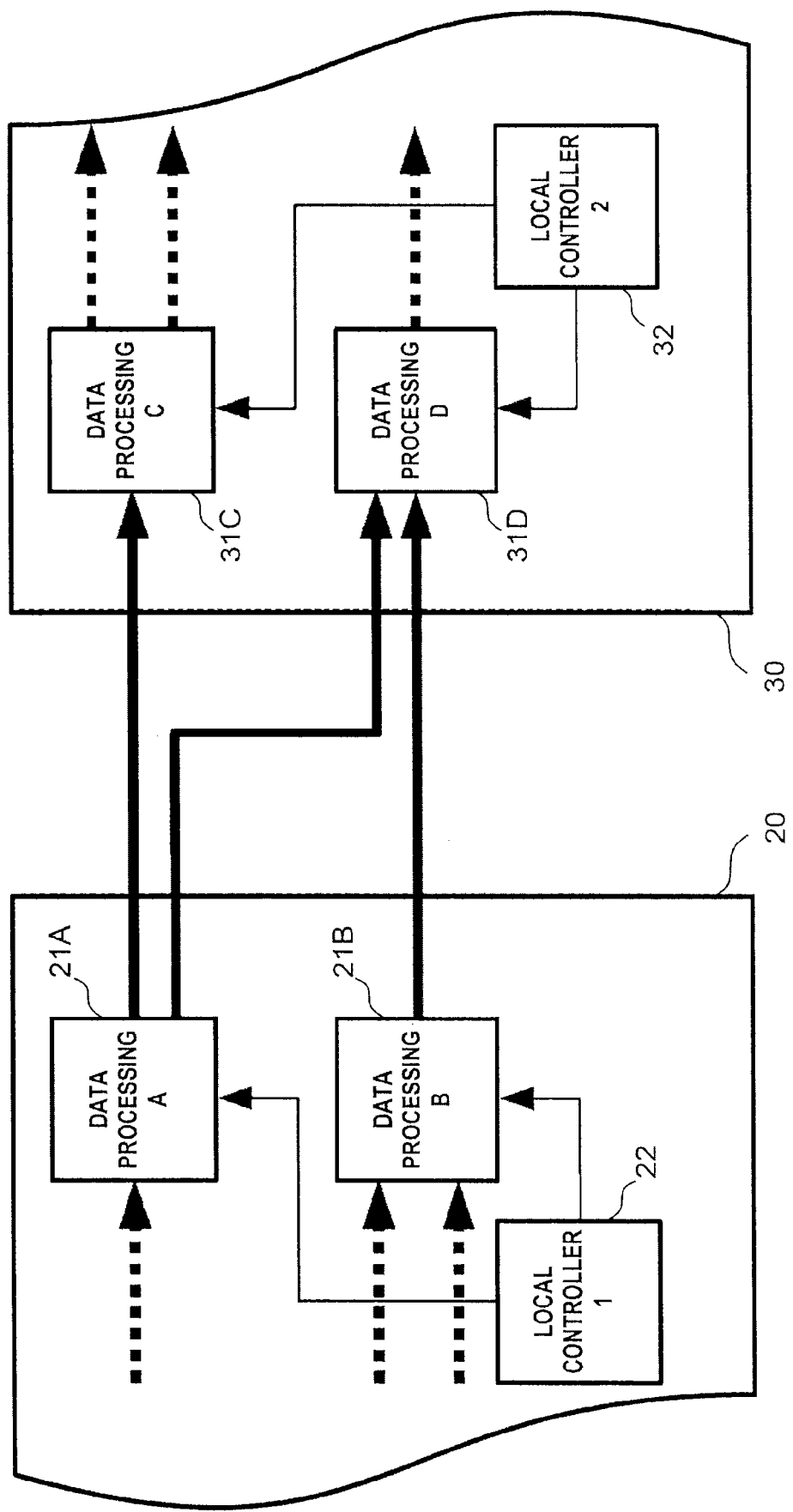
FIG. 2 shows inter-component dependencies of data flow.
Figure 3:
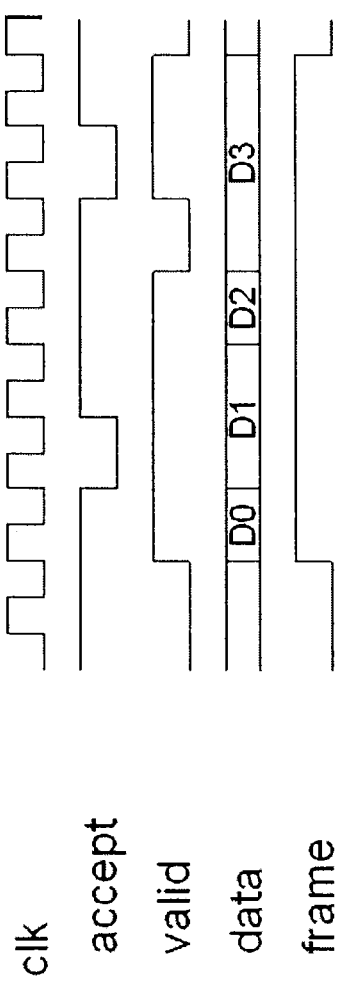
FIG. 3 shows a handshake-type streaming data protocol which is used in an embodiment of a circuit arrangement according to the invention.

The invention will now be described in detail with reference to an exemplary handshake-type data streaming transfer protocol which is illustrated in FIG. 3 and described in the applicant's co-pending European patent application "Method for High Speed Data Transfer" (EP 10 197 315.4). The protocol of FIG. 3 can be used for streaming data through a component and between several components of an SoC, such as components 11A-F, and 21A,B, 31C,D illustrated in FIGS. 1, 2 and 5.

To give an example, in the case of an SoC for use in wireless communication applications, these components or functional units are the various building blocks of the system, such as for example a digital front end (DFE), a Tx unit, a shared RAM, a forward error correction (FEC) data unit, a fast Fourier transform (FFT) unit, a parameter estimation unit, equalizer unit, searcher unit, an FEC control unit and the like, each of them including several data processing units and a local embedded controller.

The protocol comprises three binary signals including a valid and an accept signal for handshaking between a data source and a data sink, and a frame signal which marks the beginning and the end of a logical group of data elements within a data stream. The origin of the data stream is called a 'source', the destination is called a 'sink'. Data source and data sink, herein, can be any of the components of an SoC or any of the data processing modules on a component level. The valid/accept signals are similar to that from other handshake-based transfer protocols and are used to drive and stall the communication from source to sink. Source and sink can set or reset these signal at any time. Data is taken over if both are 'high' on the rising edge of the clock. Data source and data sink must have the same understanding of what the frame signal means. A 'frame' in the sense of the illustrated transfer protocol is a logical group or sequence of data, such as e.g. an OFDM symbol, a block of control data, a block of information data, etc. Data transfer only occurs if accept, valid and frame signals are high. The frame signal marks the beginning and end of a data block transfer.

However, it has to be understood that the invention is not limited to this particular streaming data transfer protocol but can generally be used with any similar handshake-type bus protocol.

Figure 4:
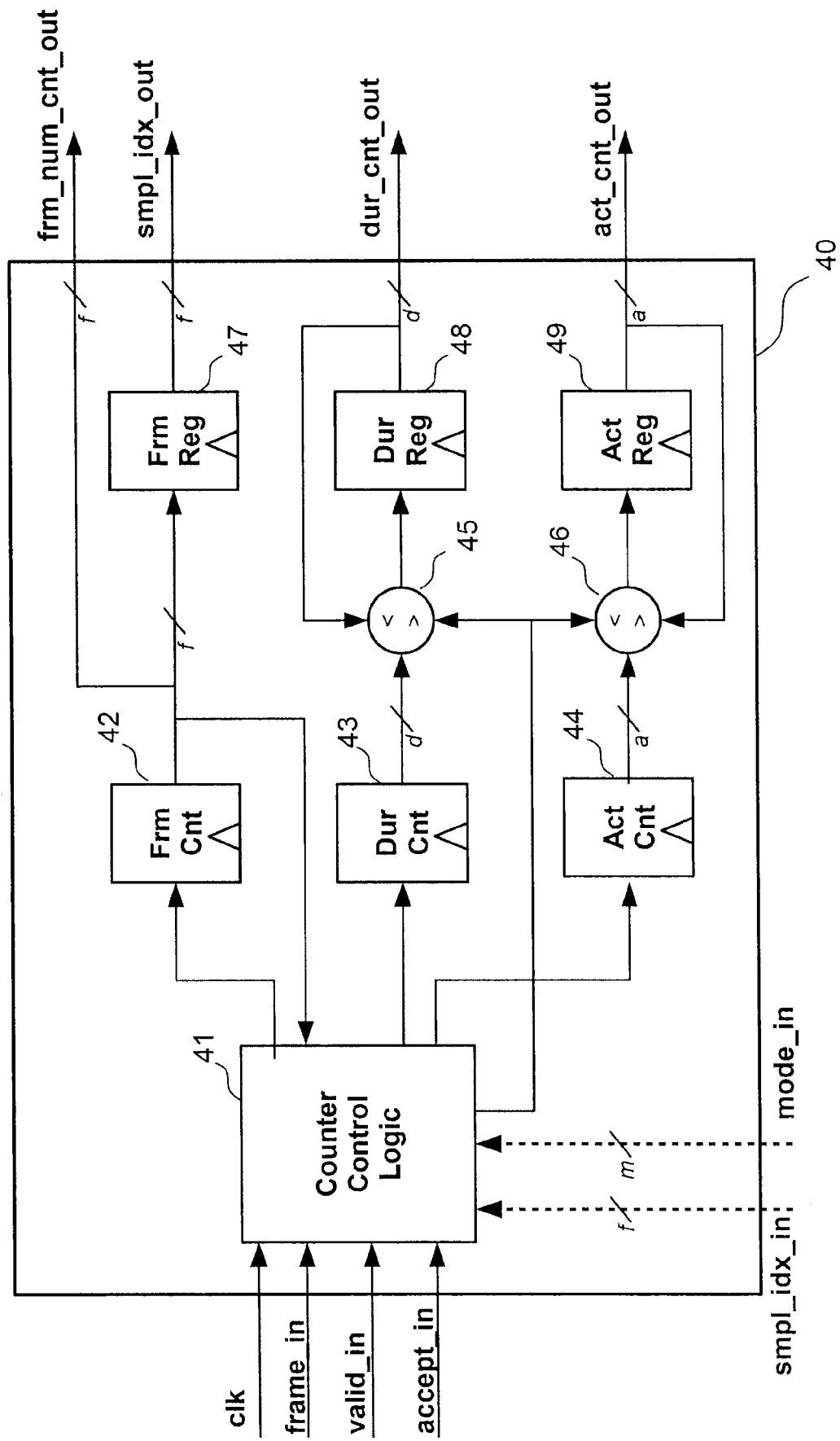
FIG. 4 shows a block diagram of a streaming data profiler unit according to the invention.

FIG. 4 shows a block diagram of a streaming data profiler unit 40 according to the invention. Streaming data profiler unit 40 is a building block below module level. To transparently instrument a data stream without interfering with the actual communication, it receives the system clock signal and a set of control signals tapped from a selected link of the streaming data bus to extract link performance parameters therefrom.

Figure 5:
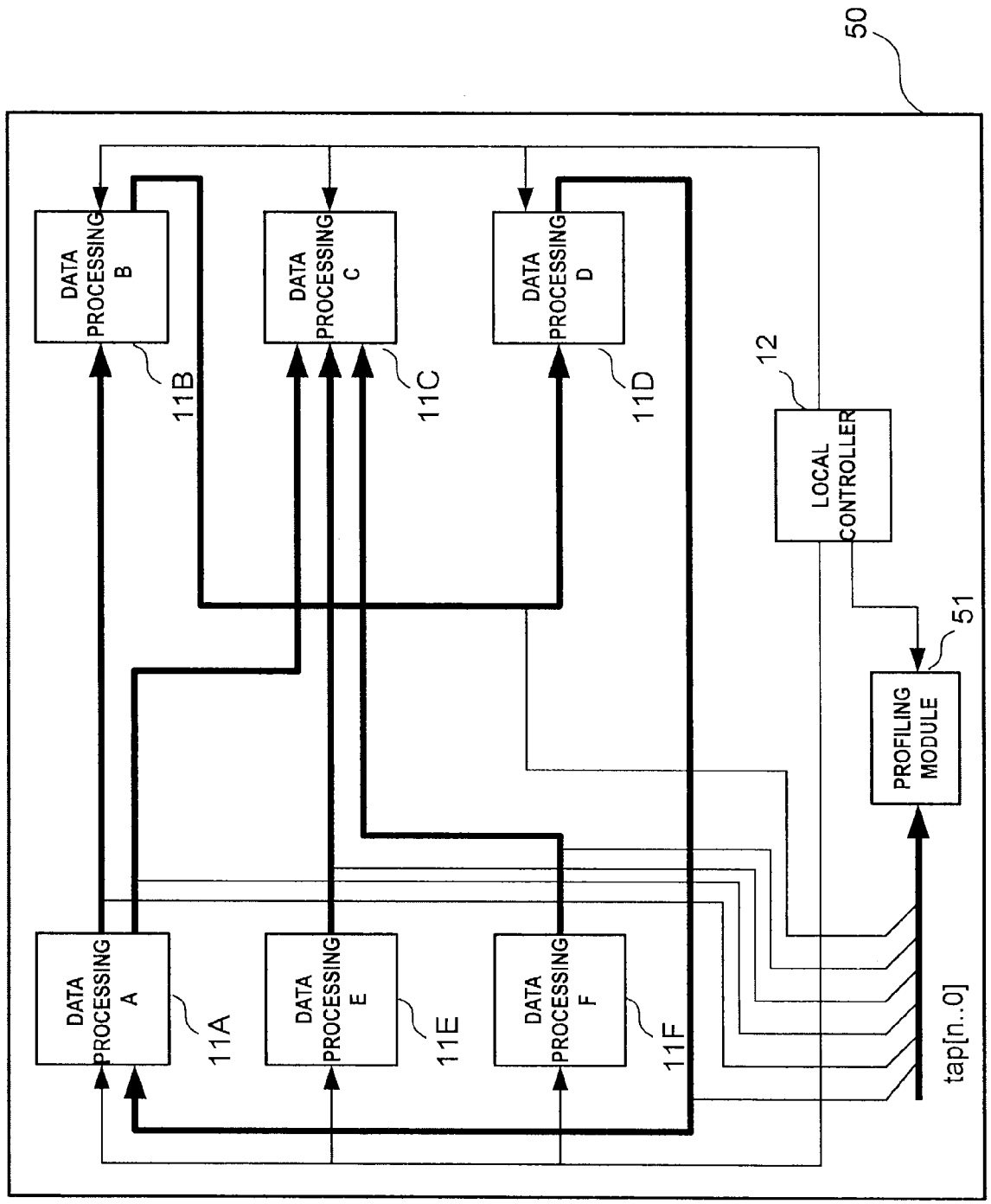
FIG. 5 shows a block diagram of a functional unit of a circuit arrangement comprising a profiler module according to the invention.

Streaming data profiler unit 40 does not contain an own control register set, instead, it is meant to be a part of a module from which it is controlled and which might select a specific streaming data stream to profile. This can be a profiling module 51 such as shown in FIG. 5 in the context of an entire functional unit and illustrated in detail in FIG. 6. Profiling module 51 could also be a part of a functional unit's MISC module.

Figure 6:
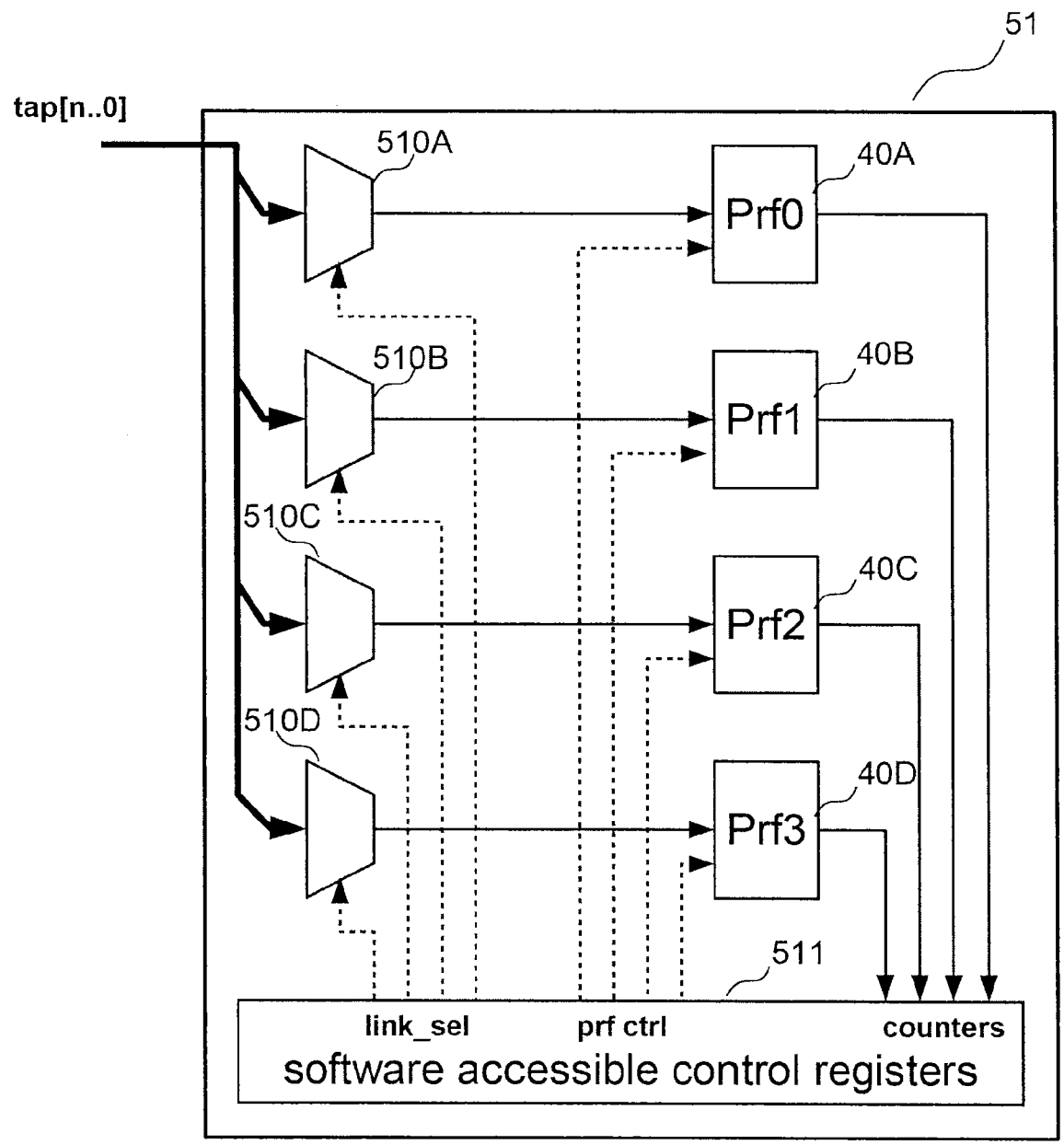
FIG. 6 shows a block diagram of one embodiment of a profiler module comprising four profiler unit as illustrated in FIG. 4.

As illustrated in FIGS. 5 and 6, a plurality of profiler units can be grouped in profiling module 51 and can be controlled by a software accessible set of control registers 511 which in turn is controlled by a functional unit's local controller such as controller 12 of FIG. 5.

FIG. 6 shows an exemplary embodiment of profiling module 51 as comprising four profiler units 40A-D, for simultaneously determining data flow performance parameters from four different interfaces of the streaming data bus. Each one of profiler units 40A-D is coupled to a respective link selection means 510A-D shown as a multiplexer. Control register 511 controls each one of multiplexers 510A-D to select a link of the streaming data bus and to pass the control signals tapped from that link to its associated profiler unit for assessing link performance parameters. Output parameters acquired by profiler units 40A-D are stored in control registers 511 to be read out by suitable software in real time or later.

Returning to FIG. 4, streaming data profiler unit 40 generally gathers profile data on link performance and communication patterns such as frame duration (first, last, min, max); data transfers within a frame (min, max); number of consecutive data cycles and/or dead cycles within a frame.

As illustrated in FIG. 4, profiler unit 40 basically consists of three counters 42, 43, 44, controlled by counter control logic 41, and corresponding storage registers 47, 48, 49. Counter control logic 41 comprises commonly known Boolean logic gates and is controlled by respective control inputs.

Based on a handshake-type streaming data protocol definition, data is transferred only when all of the valid, frame and accept signals are asserted. This condition is used to control an activity counter 44 that determines the number of data beats per frame. A duration counter 43 concurrently determines the duration of each frame, as a number of system clocks elapsed. A frame counter 42 determines the number of frames that passed since the last clear operation. Letters f, d, and a in FIG. 4 represent the respective bit widths of the frame, duration, and activity counters, respectively. Comparator 45 connected between duration counter 43 and its associated register 48, and comparator 46 connected between activity counter 44 and its associated register 49 are controlled in function of a selected acquisition mode so that the associated register gathers a minimum or maximum value, respectively, of the currently measured parameter. Exemplary acquisition modes will be listed in table 4 below.

The streaming data profiler uses three parameters as shown in the table below:

TABLE 1

Parameters of streaming data profiler unit

| Parameter | Description |
| --- | --- |
| frm_num_cnt_width_f | Frame counter width |
| dur_cnt_width_d | Duration counter width |
| act_cnt_width_a | Activity counter width |

As mentioned before, streaming data profiler unit 40 has no own control registers, rather it is controlled by a number of inputs. A non limiting list of inputs that can be used in an exemplary embodiment of the streaming data profiler unit of the invention which employs the streaming data protocol of FIG. 3 is as follows:

TABLE 2

Input signals of streaming data profiler unit

| Signal | Description |
| --- | --- |
| clk | module clock |
| rst_an | reset, async, low active |
| rst | reset, sync. to clk, high active |
| mode_in | update mode |
| smpl_idx_in | sample index selection |
| clr_cnt_in | clear counters |
| frame_in | frame signal |
| valid_in | valid signal |
| accept_in | accept signal |

There are two major measurement styles: transfer based and control based. In the transfer based style, the obtained values correspond to successful data transfers as defined by the streaming data protocol. In control based style the measurement is more fine-granular and corresponds to individual control signals of a specific frame. The measurement values are provided via three outputs that correspond to the respective counters and latch registers, respectively. In function of the measurement style, the values bear different meaning, as given by the table which follows:

TABLE 3

Output semantic in function of operation mode

| Output | Transfer based | Control based |
| --- | --- | --- |
| frm_num_cnt_out | number of frames since last counter clear event (or reset) | |
| smpl_idx_out | index of the frame to which the values belong | |
| dur_cnt_out | duration (number of clock ticks) of the sampled frame | minimum (de-) assertion time of selected control signal |

TABLE 3-continued

Output semantic in function of operation mode

| Output | Transfer based | Control based |
|---|---|---|
| act_cnt_out | number of data words transferred during the sampled frame. | maximum (de-) assertion time of selected control signal |

The following table lists exemplary acquisition modes that can be supported. Modes 0x1 . . . 0x7 belong to the transfer based measurement style; modes 0x8 . . . 0xD to the control based measurement style.

TABLE 4

Acquisition modes

| Mode | Mnemonic | Description |
|---|---|---|
| 0x0 | NOP | no operation; profiler 40 is inactive, counters 42 to 44 are not updated, yet the old values persist |
| 0x1 | FRM_1ST | counters 42 to 44 contain the values from the first frame |
| 0x2 | FRM_LAST | counters 42 to 44 contain the values from the last frame |
| 0x3 | FRM_NTH | counters 42 to 44 contain the values from the frame having the index selected by the smpl_idx_in input |
| 0x4 | FRM_MINDUR | counters 42 to 44 contain the values from the frame with the minimal duration |
| 0x5 | FRM_MINXFER | counters 42 to 44 contain the values from the frame with the minimal number of data transfers |
| 0x6 | FRM_MAXDUR | counters 42 to 44 contain the values from the frame with the maximum duration |
| 0x7 | FRM_MAXXFER | counters 42 to 44 contain the values from the frame with the maximum number of data transfers |
| 0x8 | SEL_VAL | for the frame selected by the smpl_idx_in input, the minimum and maximum duration of valid_in sampled asserted are logged |
| 0x9 | SEL_NOVAL | for the frame selected by the smpl_idx_in input, the minimum and maximum duration of valid_in sampled de-asserted are logged |
| 0xA | SEL_ACC | for the frame selected by the smpl_idx_in input, the minimum and maximum duration of accept_in sampled asserted are logged |
| 0xB | SEL_NOACC | for the frame selected by the smpl_idx_in input, the minimum and maximum duration of accept_in sampled de-asserted are logged |
| 0xC | GAP_MINDUR | duration counter 43 shows the minimum frame gap; activity counter 44 is unused; smpl_idx_out refers to the frame before the gap |
| 0xD | GAP_MAXDUR | duration counter 43 shows the maximum frame gap; activity counter 44 is unused; smpl_idx_out refers to the frame before the gap |
| 0xe . . . 0xf | rsvd. | Reserved for future use |

Streaming data profiler unit 40 illustrated in FIG. 4 is a basic building block for instrumentation of a streaming data fabric.

The various modes described above can be used for general performance profiling and will help find bottlenecks in data transport. Below, some exemplary questions are listed and how they can be answered with the help of the streaming data profiler:

Is data transfer efficient?
If measurements in one of the FRM_* modes show that frame duration is equal to the number of transfers, or if the difference is only small, then no stalls occurred.

Are the frames uniform?
If the frame duration values obtained with modes FRM_MINDUR and FRM_MAXDUR differ only a little, then the frames are sent/processed with the same speed for each iteration.

Is the data payload the same for all frames?
If the values for the number of transferred data obtained with modes FRM_MINXFER and FRM_MAXXFER are equal, then all frames bear the same number of data.

Does a specific frame in a sequence contain the expected number of data?
Use the FRM_NTH mode and apply the frame index to the smpl_idx_in input to obtain values for the frame in question.

Does a frame deviate from the average transmission pattern?
When measuring mode was FRM_MINDUR/FRM_MAXDUR or FRM_MINXFER/FRM_MAXXFER the smpl_idx_out output shows the index of the frame sticking out with a duration longer/shorter than the average or less/more data than the average.

If the transfer was stalled, was it one big pause or many small pauses?
If the minimum/maximum values obtained in the SEL_VAL or SEL_ACC modes are similar (and smaller than the difference b/w frame duration and number of transfers obtained before), then there were many small pauses, otherwise fewer but bigger pauses.

Was the transfer stalled by the sender or the recipient?
If either minimum and/or maximum of the durations obtained in mode SEL_NOVAL are bigger than the minimum/maximum durations obtained in mode SEL_NOACC, then the stall was mainly caused by the sender, because it was less often able to provide new data. Otherwise, the stall was mainly caused by the recipient, because it was less often ready to accept new data.

Are frames transferred with the expected interval in between?

The GAP_MIN and GAP_MAX modes can be used to obtain a minimal and maximal duration of the frame gap.

The streaming data profiler of the invention can also support debugging by detecting unexpected communication patterns and thus guiding more intrusive means of debugging.

Two non limiting examples for this function are:

Are there frames with missing or excess data?

If the values for the number of transferred data obtained with the FRM_MINXFER or FRM_MAXXFER modes are not as expected, than the frame indicated by the smpl_idx_out output is missing and/or has too many data.

Does a certain frame transport the expected number of data?

The FRM_NTH mode can be used and the frame index can be applied to the smpl_idx_in input to obtain values for the frame in question.

The invention claimed is:

1. A circuit arrangement comprising a plurality of functional units, each unit comprising a plurality of data processing modules and a local controller, said plurality of data processing modules running a common system clock and being connected by a streaming data bus running a handshake-type streaming data transfer protocol which comprises three control signals including first and second handshake-type control signals and a third control signal which marks a beginning and an end of a frame comprised of a logical group of data elements within the data stream, wherein at least one of said functional units further comprises a profiling module which receives at least one set of said first, second, and third control signals tapped at a predefined link of said streaming data bus during real time operation, for determining link performance and communication patterns of said streaming data stream for profiling and debugging purposes;

wherein said profiling module comprises at least one link selection means, a respective profiler unit connected to each of said at least one link selection means and adapted to receive the system clock signal and the set of control signals tapped from the selected link to extract link performance parameters therefrom, and a software accessible set of control registers for defining a link to be assessed, a link performance acquisition mode, and a time period of the control signals to be assessed, and for storing link performance output parameters from said profiler units; and wherein said profiler unit comprises a first counter for determining a number of frames that passed since a last clear operation, a second counter for determining a duration of the sampled frame, a third counter for determining a number of data beats of the sampled frame, and a counter control logic for controlling said first, second, and third counters for a selected frame to be sampled.

2. The circuit arrangement of claim 1, wherein said profiler unit further comprises a first register connected to an output of the first counter, a first comparator connected between an output of the second counter and a second register, and second comparator connected between an output of the third counter and a third register, said counter control logic being adapted to configure said counters, comparators, and registers for a selected frame to be sampled and in function of a selected acquisition mode.

3. A method for profiling a data flow of streaming data for use in a circuit arrangement which comprises a plurality of functional units, each functional unit comprising a plurality of data processing modules and a local controller, said plurality of data processing modules running a common system clock and being connected by a streaming data bus running a handshake-type streaming data transfer protocol which comprises three control signals including first and second handshake-type control signals and a third control signal which marks a beginning and an end of a frame comprised of a logical group of data elements within the data stream, the method comprising the steps of:

providing a tapping line from a plurality of links of said streaming data bus between any pair of said data processing modules;

selecting a link to be assessed; selecting a link performance acquisition mode;

tapping said first, second, and third control signals from the selected link to be assessed;

determining a set of link performance parameters from said first, second, and third control signals and said common system clock for a predefined time period of the control signals; and wherein the step of determining a set of link performance parameters comprises counting a number of frames that passed since a last clear operation, counting a number of clock ticks for a sampled frame, and counting a number of data beats of the sampled frame.

4. The method of claim 3, wherein the step of determining a set of link performance parameters comprises, for a selected frame, determining minimum and maximum duration of the first control signal sampled asserted.

5. The method of claim 3, wherein the step of determining a set of link performance parameters comprises, for a selected frame, determining minimum and maximum duration of the first control signal sampled de-asserted.

6. The method of claim 3, wherein the step of determining a set of link performance parameters comprises, for a selected frame, determining minimum and maximum duration of the second control signal sampled asserted.

7. The method of claim 3, wherein the step of determining a set of link performance parameters comprises, for a selected frame, determining minimum and maximum duration of the second control signal sampled de-asserted.

8. The method of claim 3, wherein the step of determining a set of link performance parameters comprises determining a minimum or a maximum frame gap and the frame before the gap.

* * * * *